United States Patent [19]
Hansen

[11] 3,769,840
[45] Nov. 6, 1973

[54] METHOD AND APPARATUS FOR GRAVITY GRADIOMETRY

[75] Inventor: Siegfried Hansen, Los Angeles, Calif.

[73] Assignee: Hughes Aircraft Company, Culver City, Calif.

[22] Filed: Oct. 29, 1971

[21] Appl. No.: 193,777

[52] U.S. Cl. ................................................ 73/382
[51] Int. Cl. ............................................. G01v 7/16
[58] Field of Search ......................... 73/382, DIG. 10

[56]  References Cited
UNITED STATES PATENTS
| | | | |
|---|---|---|---|
| 3,273,397 | 9/1966 | Forward | 73/382 |
| 3,509,636 | 5/1970 | Hansen | 73/382 X |
| 3,616,698 | 11/1971 | Corey et al. | 73/514 |

FOREIGN PATENTS OR APPLICATIONS
| | | | |
|---|---|---|---|
| 165,909 | 1/1965 | U.S.S.R. | 73/382 |

*Primary Examiner*—James J. Gill
*Attorney*—W. H. MacAllister, Jr. et al.

[57]  ABSTRACT

Gravity gradiometry measurements are accomplished by mounting two sensitive local gravity sensors on a stiff bending beam and feeding back signals to bend the beam, in accordance with local gravity vector signals. The sensitive axes of the several local gravity sensors are directed in generally the same direction. The bending beam and the sensors mounted thereon are supported in a pendulous structure which has a plane isolated from local accelerations in the plane. The bending beam, with its sensors, is mounted in that plane so that they are isolated and sense only gravity gradients.

25 Claims, 8 Drawing Figures

METHOD AND APPARATUS FOR GRAVITY GRADIOMETRY

BACKGROUND

This invention is directed to an apparatus for measuring gravity gradients and the method for such gravity gradiometry.

The measuring of gravity gradients has been required as an investigative tool for inquiry in a plurality of different disciplines. Gravity gradiometry has been considered in earthquake research. The investigation of subsurface masses has been of geological interest for investigating subterranean structures. While of general geologic interest, such investigation is of specific value in the search for and development of subterranean resources. In addition to subterranean work, gravity gradient equipment has been orbited around the earth for a more gross view of earth's gravity gradients and has been orbited around the moon for investigation of the moon's masses. It is also clear that, with a suitably sensitive gravity gradiometer, masses of other than natural origin can be discovered. Prior gravity gradient sensors include the rotating sensors of Robert L. Forward U.S. Pat. No. 3,273,397 and Curtis C. Bell U.S. Pat. No. 3,564,921. By these devices, gravity gradients can be sensed.

In another field of inventive activity and gravitational measurement, Siegfried Hansen's U.S. Pat. Nos. 3,409,993 and 3,486,238 are directed to tiltmeters. These are precision level devices which detect changes in the direction of the local gravity vector with respect to the bottom plane of a flat plate. The moving structure is a bubble in liquid under the flat plate. When accelerations other than normal to the bottom plane of the flat plate are applied, the bubble acts like a negative mass. Thus, the structure is subject to horizontal accelerations. This characteristic is exploited in employing the devices as a bubble seismometer, as is taught in Siegfried Hansen U.S. Pat. No. 3,509,636.

It has been recognized that an accelerometer can be mounted on a pendulum with its sensitive axis in the direction of motion. The purpose of this is to isolate the accelerometer from accelerations other than along the length of a pendulum. In such a case, the accelerometer would have a zero output, if placed exactly at a distance from the pivot point equal to the length of an ideal pendulum having the same period. This is useful for testing the zero setting of the accelerometer. This is touched on in Stanford University Center for Research Systems Guidance and Control Laboratory, May, 1970 Report SUDAAR 399 for the Air Force Avionics Laboratory AFAL-TR-70-88. This conception has no applicability to a plurality of sensors arranged to detect gravity gradients.

SUMMARY

In order to aid in the understanding of this invention, it can be stated in essentially summary form that it is directed to a method and apparatus for gravity gradiometry. The gradient sensor comprises at least first and second local gravity vector-sensing devices mounted in spaced position on a bending beam, together with motor means for bending the beam to correspond to the gravity equipotential surface. Furthermore, the beam is mounted on a pendulous structure of such nature that the sensors are isolated so that gravity gradient can be accurately measured.

Accordingly, it is an object of this invention to provide a method and apparatus for gravity gradiometry. It is a further object to provide a bending beam gravity gradiometer wherein a plurality of gravity vector sensors are mounted upon the beam, and feedback from the sensors to apparently restore sensor direction measures gravity gradients. It is another object to provide more than two such sensors on a bending beam with appropriate interconnection for servo feedback. It is yet another object to provide a bending beam gravity gradiometer which is mounted upon a pendulous support which isolates the gravity gradiometer from horizontal accelerations. It is yet another object to provide a pendulous structure which has a critical plane normal to the length of the pendulum and spaced from the pivot point of the pendulum, which plane is isolated from net horizontal accelerations. It is a further object to provide a logic network between a plurality of gravity vector sensors, motor means for bending the beam on which the sensors are mounted, and output-signalling means so that signals representing the gravity gradients are produced.

Other objects and advantages of this invention will become apparent from a study of the following portion of the specification, the claims, and the attached drawings.

DESCRIPTION

Devices for determining direction of the local gravity vector are seen in Siegfried Hansen U.S. Pat. Nos. 3,409,993 and 3,486,238. Additionally, Siegfried Hansen U.S. Pat. No. 3,509,636 shows a structure which can be employed in that manner. These devices employ a fluid bubble constrained under a flat surface, rather than the curved surface employed by other tilt-detecting equipment. Additionally, an active servo control system is used to continuously maintain the flat surface in a horizontal position with reference to the local gravity vector. The restoring force produced by the servo control system is thus an indication of the departure from level of the reference base against which the servo control force system acts.

Figure 5:
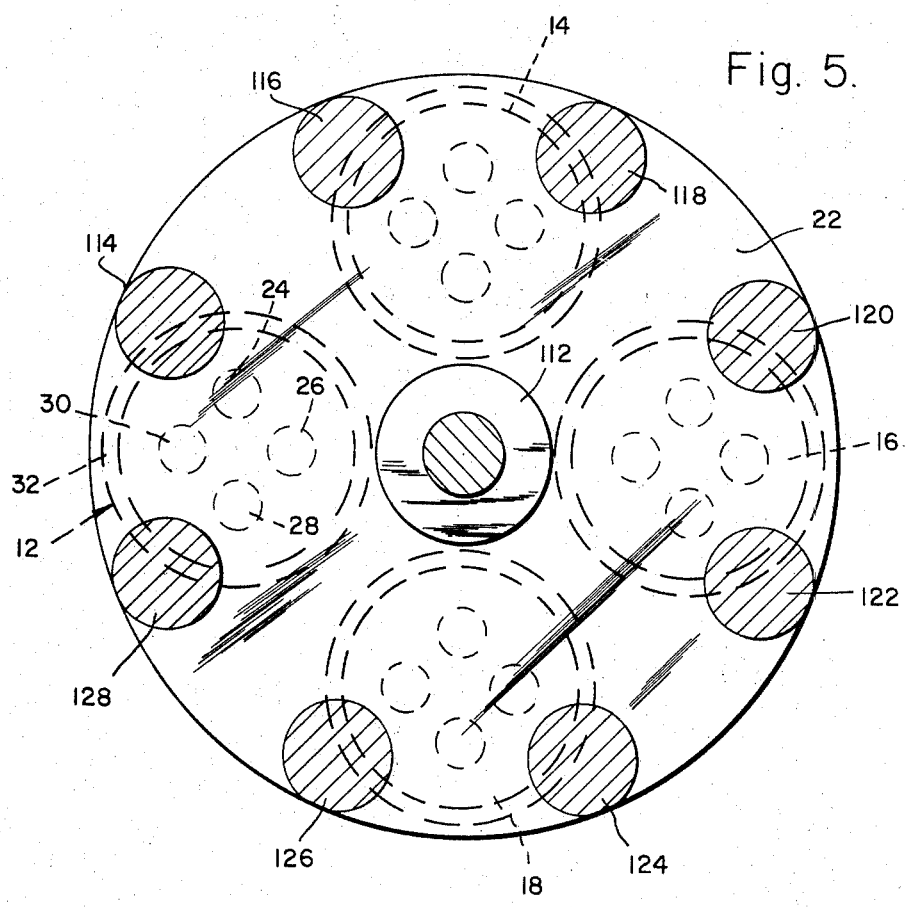
FIG. 5 is a further enlarged section taken generally along the line 5—5 of FIG. 4.
Figure 4:
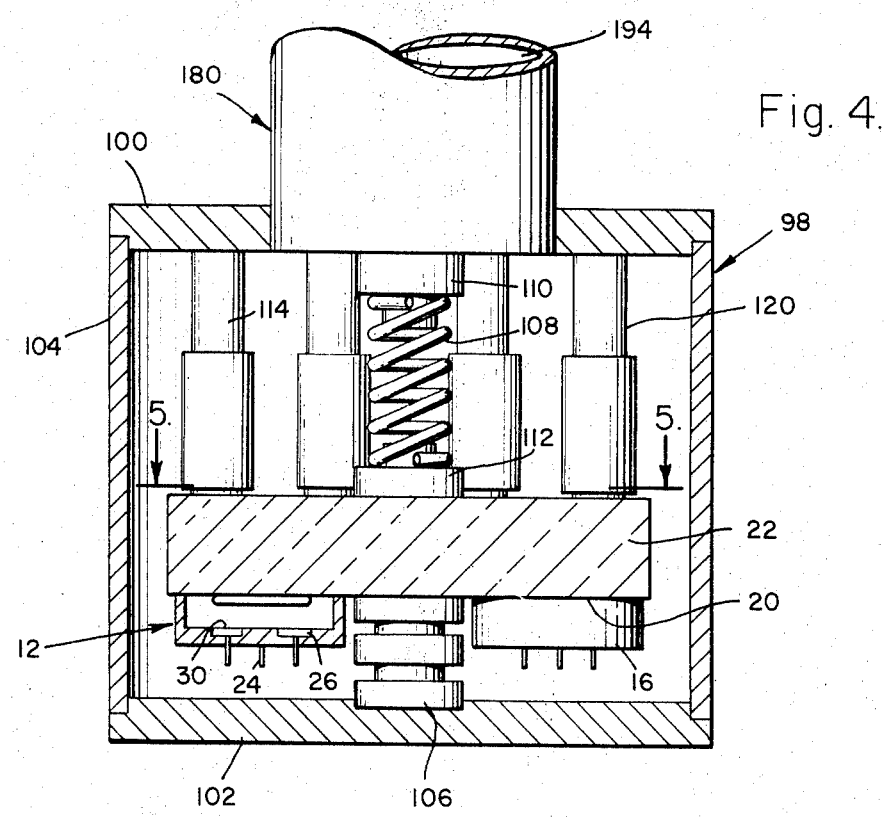
FIG. 4 is an enlarged partial section through the lower part of the pendulum of the gradiometer of FIG. 2.

Referring to the drawings, and particularly FIGS. 4 and 5, the gravity gradiometer 10 has four bubble chambers generally identified at 12, 14, 16, and 18. Each of these bubble chambers is positioned under the flat undersurface 20 of flat disc 22. The disc 22 is a fused quartz optical flat for low sensitivity to thermal gradients and temperature changes and the minimization of plastic creep in the disc. The flat undersurface 20 is of high precision.

The bubble chambers are mounted under the disc, either by mechanical mounting and O-ring sealing, or by adhesive securement, which accomplishes both results. Each of the bubble chambers is a sealed fluid chamber having a set of sensing electrodes. The electrodes are used for determining the position of the bubble. The diameter and depth of the bubble chamber are such that, with a particular liquid in which the bubble is formed, a bubble will assume the form of a flat disc with rounded edges. The thickness or depth of the bubble disc is essentially independent of diameter (if the bubble diameter exceeds ½ inch) and will be approximately ⅛ inch for a bubble formed in alcohol. The bubble diameter is less than the diameter of the bubble chamber. A suitable bubble is about one-half the diameter of the bubble chamber. The fact that a bubble does not reach the bottom of the bubble chamber permits the electrodes to be placed at a depth where they will not contact the bubble in normal operation, thus avoiding unpredictable surface tension forces.

The displacement of a bubble under a spherical surface is a direct measure of the tilt angle. The bubble will reach a stationary equilibrium position for each new value of tilt. When a flat surface is used, as in the present gradiometer, the behavior is drastically modified. Now, the bubble can only be stationary, when the plate is truly horizontal. There will be no characteristic position of equilibrium as a function of tilt angle. If a small fixed tilt is introduced, the bubble will quickly attain some constant velocity and will continue to move at this velocity until it encounters an obstacle. For small angles, this velocity is accurately proportional to the tilt angle. Bubble displacement is defined as the time integral of velocity, so that it is evident that the sensor and its displacement-sensing electrode system constitute an integrator whose output is the time integral of the tilt angle. The servo control system employs feedback to relevel the flat plate at the bubble to reduce the bubble velocity to zero.

Figure 6:
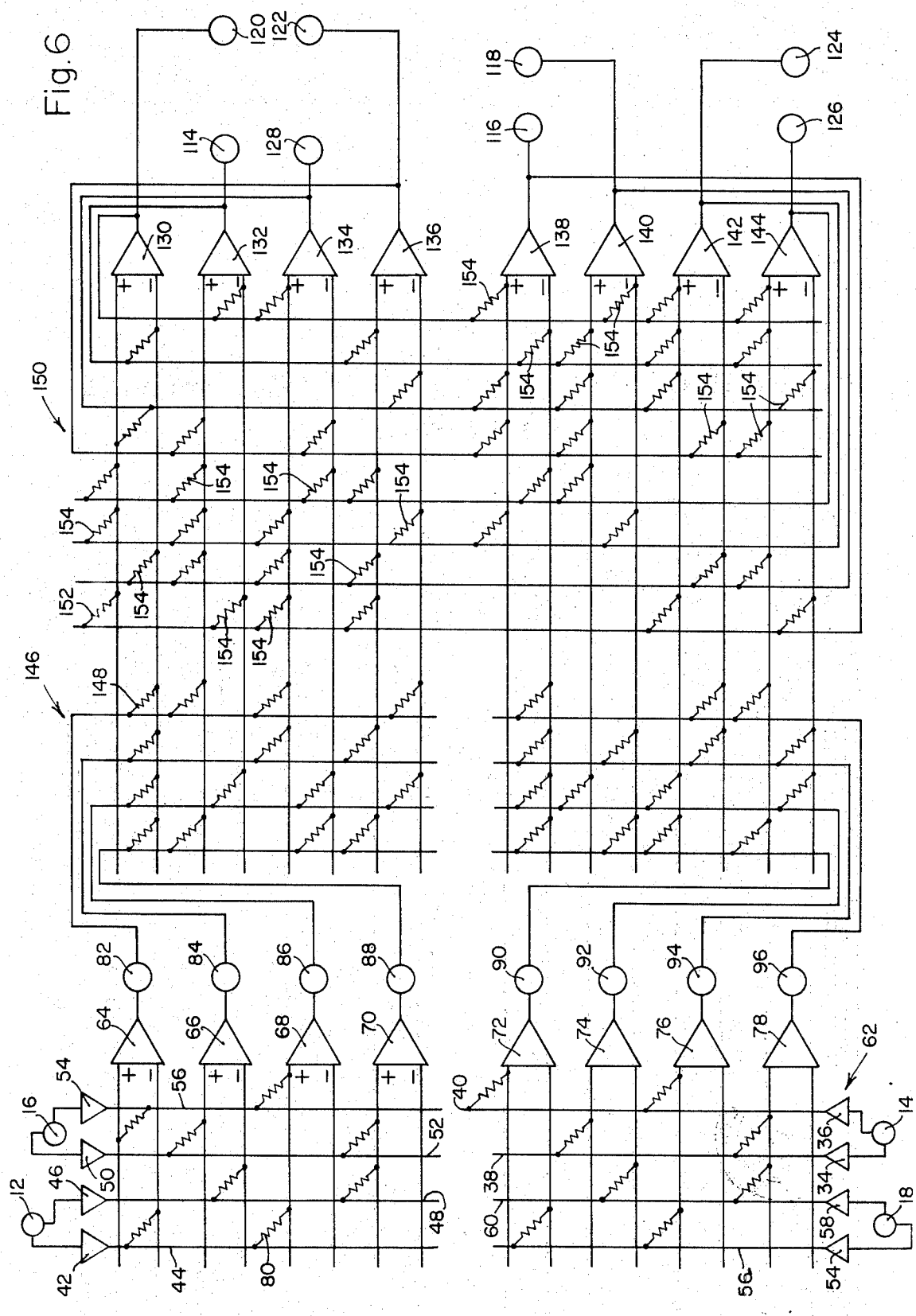
FIG. 6 is a schematic circuit diagram of an interconnecting matrix network between the sensors and the restoring motors.

Considering each of the bubble chamber tilt-detecting devices in detail, the bubble chamber structure 12 is shown in top plan in FIG. 5 and in vertical section in FIG. 4. The remaining bubble chamber sensor devices are identical with this one. Considering the drawing of FIG. 5 as being positioned in normal map orientation with north at the top, chamber 14 is considered the north chamber tilt-sensing device, with chambers 16, 18, and 12 being respectively considered the east, south, and west bubble chamber tilt-sensing devices. Each of the bubble chambers has four electrodes in the bottom thereof, below the bottom of the bubble, as previously discussed. These electrodes are indicated at 24, 26, 28, and 30 and are respectively the north, east, south, and west electrodes of bubble chamber 12. Additionally, the outer ring 32 is in the form of an electrode. As is taught in Siegfried Hansen U.S. Pat. No. 3,486,238, the quadrant electrodes are connected with respect to the ring electrode and with respect to an oscillator to form a bridge with four fixed arms and four variable arms. The bridge output signals the position of the bubble in the two orthogonal directions. The bridge output goes through a demodulator and amplifier, as schematically illustrated at the left of FIG. 6.

Releveling of the entire disc 22 will be accomplished in response to the combined signals of all four of the bubble chambers 14, 16, 18, and 20 in a manner similar to the leveling of the flat in a single multiple chamber tiltmeter. However, this overall leveling will not suffice to stop bubble motion in all four of the bubble sensors, even assuming that they are operating under a flat surface, because there will be gravity gradients operating on the different bubbles in different directions. It is necessary to provide additional local control or bending of the disc 22 at each of the separate bubble chambers. This can be done by applying contolled forces which bend and twist the flat in a systematic manner. The control of the four bubbles, each with two degrees of freedom, requires a control system having eight degrees of freedom. This is implemented as a control system with eight independent amplifier and demodulator channels, as illustrated at the left of FIG. 6. In that figure, the symbols at 34 and 36 indicate demodulating amplifiers in which the bubble position signal, as excited by the oscillator and amplified as AC, is followed by demodulation and DC amplification. The fact that demodulator amplifier 34 is connected at the west side of the symbols for bubble chamber 14 means that line 38, at the output of this amplifier, has a signal which is a function of west-to-east bubble portion, with the west being the positive direction. Similarly, the fact that demodulating amplifier 36 is connected to the north side of the symbol for bubble chamber 14 in FIG. 6 means that its output line 40 carries a signal representing the north-to-south position of the bubble in chamber 14, with the north direction being positive.

Similarly, the west-to-east bubble position in chamber 12 is connected through demodulating amplifier 42 to line 44, the south-to-north bubble position in chamber 12 is connected through demodulation amplifier 46 to line 48. Additionally, the north-to-south bubble position of chamber 16 is connected through demodulating amplifier 50 as its output line 52, while the east-to-west bubble position is connected through demodulating amplifier 54 to amplifier output line 56. Next, bubble chamber 18 has its south-to-north bubble position indication connected through demodulating amplifier 54 to amplifier output line 56, while it has its east-to-west bubble position signal connected through demodulating amplifier 58 to amplifier output line 60.

These signals are bubble position signals under several bubble chambers and they cannot be directly applied to force motors for releveling and bending of disc 22. Signal organization is accomplished in network 62. The sensor signals are summed and differenced to produce eight signals which represent the tilt, indicated bend and twist of the disc 22. Operational amplifiers 64, 66, 68, 70, 72, 74, 76, and 78 each have a positive and negative connection by which signals which are to be added or subtracted are put into the respective amplifiers. Each of the positive and negative lines of operational amplifiers 64 through 70 is connected across the outputs of demodulator amplifiers 42, 46, 50, and 54, while each of the positive and negative input lines of operational amplifiers 72, 74, 76, and 78 are connected across the output lines of demodulator amplifiers 54, 58, 34, and 36, as shown at the left of FIG. 6. The network 62 thus formed is completed by the addition of interconnecting resistances which make the matrix connections and accomplish the addition functions from the demodulator amplifier outputs to the operational amplifier inputs. An example of the interconnection is resistance 80. The resistances are installed as indicated to accomplish resolution of the bubble chamber signals into recognizable resolved signals.

As a particular example, the demodulator amplifiers of which amplifier 42 is an example are Model $\mu$A 741 operational amplifiers, purchased from Fairchild, or Precision Monolithics, followed by a demodulation in the form of a Burr-Brown Model 4094/15c multiplier. Each of the interconnection resistances in the network 62 which form the matrix has the same value, and the fairly high value of 10K ohms is suitable. Currents are added so that the low input impedance operational amplifiers 64 through 78 receive in each of its lines the sum of the currents. The operational amplifiers 64 through 78 are conveniently Model $\mu$A741, identified above.

The network 62 illustrated conveniently computes signals as operational amplifier outputs. The net gain of these amplifiers is controlled by channel gain controls 82 through 96, each respectively connected at the amplifier outputs. These gain controllers can either be variable resistance connected serially in line, or potentiometers connected between line and ground.

Still considering the upper part of the sheet on which FIG. 5 is located as being north, north-to-south bends can be readily understood, for example, bending downward around an east-to-west axis. In this case, both chambers 14 and 18 should be bent up toward the viewer, in order to obtain bubble position equilibrium. It would also be defined as north-south bend, if both of them had to be bent away from the viewer down below the plane of the paper in order to obtain equilibrium. North-south twist is seen, when the disc 22 must be twisted around the radius which lies in the plane of the drawing and extends in the north-south direction, in order to obtain bubble equilibrium in the chambers 14 and 18. Next, considering an east-west diameter in the plane of the paper, north-sourth radial tilt is detected, when the entire disc 22 must be tilted by rotation around that axis, as detected by the local chambers 14 and 18. Finally, north-south tangential tilt is one where tilt around a north-south diameter is required to bring the bubbles to stationary position, as detected bubble chambers 14 and 18.

Similarly, considering the bubble chambers 12 and 16, there is east-west radial tilt, east-west tangential tilt, east-west bend, and east-west twist. The xx plane is a north-south vertical plane, while the yy plane is an east-west vertical plane.

The gravity gradiometer 10 includes housing 98 in which the disc 22 and the bubble chambers are located. Housing 98 has top 100 and bottom 102, each of which is preferably a circular disc. Cylindrical tube 104 forms the sidewalls of the housing and is secured to both the top and the bottom to form an enclosure in which the disc 22, with its associated equipment, is located. Disc 22 is mounted upon a stiff spring 106. Spring 106 is a stiff compression and flexural spring which permits the disc 22 to tilt with respect to bottom 102. Compression spring 108 is mounted upon spring guides 110 and 112 which respectively engage the top of housing 98 and the top of disc 22. The purpose of compression spring 108 is merely to clamp the disc 22 onto the top of spring 106. Aside from this function, the compression spring 108 is sufficiently resilient to not provide forces which significantly affect the gradiometer operation.

A plurality of motors acts vertically upon disc 22. In order to accomplish the proper tilting, bending and twisting of disc 22, eight motors are necessary. In FIG. 5, it is seen that they are located 45° apart, 22 ½ on each side of the orthogonal axes of the plan view of FIG. 5. In FIG. 5, the force motors are indicated at 114, 116, 118, 120, 122, 124, 126, and 128. These motors are combinations of permanent magnets and DC coils of the nature of force motors 18, shown in Siegfried Hansen U.S. Pat. No. 3,509,636. The arrangement is such that, when a current is passed through the coil, the resultant magnetic field interacts with the permanent magnetic field to provide a force axial of the motor. As illustrated in FIGS. 4 and 5, the force motors are mounted normal to the general plane of the bottom of disc 22. Furthermore, they are mounted so that extension forces of the motors cause compression of spring 106 and concave downward bending of disc 22.

The amplifiers 64 through 78 produce various signals which do not directly correspond to the signals to be applied to the motors 114 through 128 to cause the disc 22 to be tilted, bent and twisted to cause the bubbles to each be stationary. Operational amplifiers 130, 132, 134, 136, 138, 140, 142, and 144 are conventional operational amplifiers having input lines which permit the introduction therein of an additive signal and a subtractive signal. Operational amplifiers manufactured by Philbrick/Nexus Division of Teledyne and available as Model No. 1024 are suitable, when a DC power amplifier is attached to the output. These operational amplifiers are respectively connected to motors 120, 114, 128, 122, 116, 118, 124, and 126. Matrix network 146 is an interconnection between the outputs of amplifiers 62 through 78 and the inputs of amplifiers 130 through 144. Appropriate resistors 148 interconnect the lines, in order to accomplish the necessary additive and subtractive criteria for the converting of the signals of the one character into suitable inputs for the amplifiers 130 through 144. The resistors 148 are positioned in a suitable manner, illustrated in FIG. 6, in the matrix network 146 to accomplish this result. Resistors 148 are of a suitably high impedance, such as 10K ohms, similar to resistors 80. If the gain control devices 82 through 96 are not required, the networks 62 and 146 could be combined with some simplification. However, it is convenient to organize the signals in this way so that separate gain adjustments can be made for each mode, since the transfer functions of these modes differ quite significantly.

The signals produced by network 146 are fed in additive and subtractive manner to the operational amplifiers 130 through 144. As noted, the output signals of these operational amplifiers are preferably amplified at the motor inputs for convenience in motor design and use of conventional lower power operational amplifiers. A fairly linear DC power amplifier is preferred. The outputs of amplifiers 130 through 144 are respectively fed back to matrix network 150, whereby each of the outputs of operational amplifiers 130 through 144 has an opportunity to connect to each of the inputs of these amplifiers. The high impedance inputs, such as by resistor 152, make the selected interconnections shown. However, in network 150, most of the resistors are 10K ohms, as the previous network resistors, but those indicated by the reference character 154 has four times the transmissivity, or 2.5K ohms. As a result of this feedback, when one motor is powered or caused to apply a thrust to the disc 22, the other thrustors are correspondingly energized to prevent that thrust from tilting, bending or twisting the disc 22 in a way which affects any of the other bubbles. In this way, the disc 22 is tilted bent and twisted by the motors to bring each bubble to a stationary condition, the position of which away from center causes sufficient signal to maintain the motor stress. Thus, equilibrium in a new condition corresponding to gradient is achieved. The feedback is arranged so that the signal to a given motor affects only the nearest bubble. This avoids multi-path feedback and instability.

Figure 7:
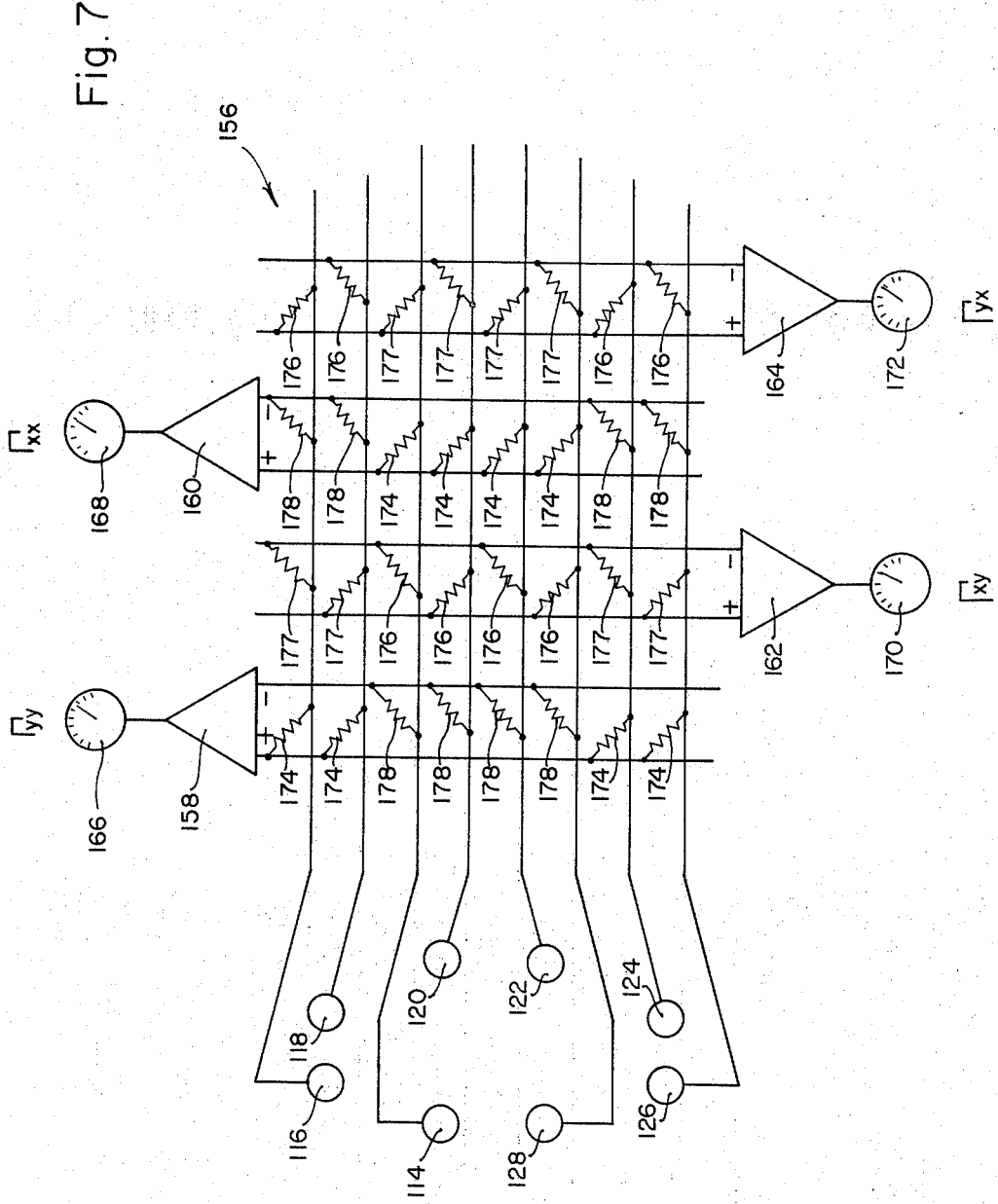
FIG. 7 is a schematic matrix network of the circuitry between the motors and output-signalling equipment.

Referring to FIG. 7, matrix network 156 is shown therein. At the left of this figure, the motors 114, 116, 118, 120, 122, 124, 126, and 128 are shown. The horizontal connecting lines through network 156 are connected to the motors and, thus, comprise the motor energization. Network 156 computes the gravitational gradients from the motor energization, which represents motor thrust.

Operational amplifiers 158, 160, 162, and 164 are connected to the vertical lines of the network 156. Again, the operational amplifiers have input lines for both additive and subtractive signals and are low input impedance devices which read the sums and differences of currents to their input lines. Suitable operational amplifiers are Precision Monolithic Model SSS725c. They respectively have output signal devices 166, 168, 170 and 172 connected to the amplifier outputs. The network is arranged in such a way and the gains of the operational amplifiers are adjusted so that the output signal devices read the gravity gradients. The output signal devices can be visual devices, can be visual recording devices, or can be other types of data-handling equipment whereby gravity gradients can be signalled. For example, if the gravity gradiometer is located in a remote place, a radio link may be employed. In another case, automatic mapping equipment may mark gravity gradients directly upon a map plan form. Output signal device 166 shows the gradient $\Gamma_{yy}$, output signal device 168 shows the gradient $\Gamma_{xx}$, output signal device 170 shows the gradient $\Gamma_{xy}$, and output signal device 172 shows the gradient $\Gamma_{yx}$.

Resistors interconnect the network 156, as indicated, to provide this data. The resistors marked with the reference character 174 are 15,200 ohms, the resistances indicated with the reference character 176 are 38,000 ohms, the resistances indicated by the reference character 177 are 30,500 ohms, while the resistances indicated by the reference character 178 are 250,000 ohms. This network construction results in additive and subtractive calculation with adjustable gain in the operational amplifiers to produce the gradient signals indicated.

Figure 2:
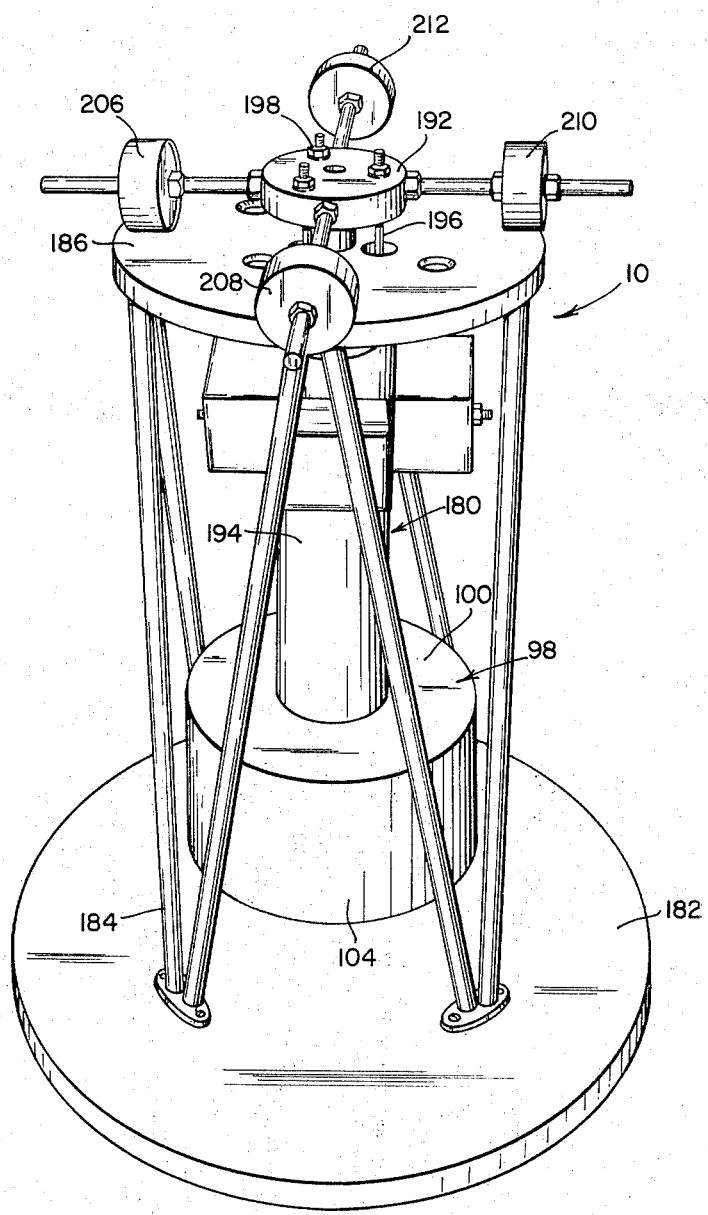
FIG. 2 is a perspective view of a gravity gradient apparatus which is operable to sense the gradient in the horizontal plane.
Figure 3:
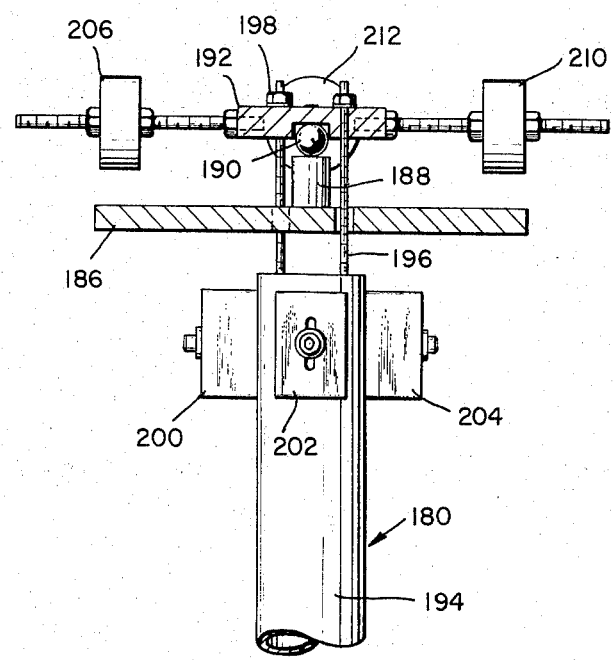
FIG. 3 is a partial section through the upper pivot structure of the gradiometer of FIG. 2.

The supporting structure of gradiometer 10 is shown in FIGS. 2, 3, and 4. It is clear that a bubble tiltmeter is responsive to horizontal accelerations due to its mounting, as well as nonvertical gravity gradients. Therefore, support structure 180 is a pendulum which is provided for specially supporting the gradient-measuring equipment in housing 98, so that it is isolated from horizontal accelerations of the gradiometer mount, such as those experienced in a vehicle. Isolation is achieved by the support structure described below. The manner in which the support structure achieves the isolation is also discussed.

Base 182 is provided for mounting upon any suitable support, such as any fixed earth-mounted foundation, or in a vehicle such as an airplane where it is subjected to mild horizontal accelerations. Legs 184 extend upwardly from base 182. On the top of legs 184 is secured platform 186 which forms the platform from which support structure 180 depends. As seen in FIG. 3, hardened block 188 is positioned on top of platform 186 to serve as a hard flat surface for engagement by pivot ball 190. Plate 192 has a socket in its lower surface in which is located pivot ball 190. Pivot ball 190 is also hardened so that there is low resistance to rolling of the ball on the block. This structure provides universal pendulum movement in the same manner as a double knife-edge support.

Mast 194 extends downward from plate 192. It is secured thereto by means of studs 196 which are fixed to the mast and extend through clearance holes in platform 186 and are adjustably mounted with respect to plate 192. By tightening the nuts 198 on the studs on top of plate 192, the mast 194 can be adjustably raised or lowered. As seen in FIG. 4, top 100 of housing 98 is secured to mast 194. Therefore, the entire structure of plate 192, mast 194, together with housing 98 and its contents depend as a pendulum below the pivot point defined by pivot ball 190 on its hardened block 188.

In view of the fact that the support structure 180 has the characteristics of a pendulum, and the correct moment of inertia is required for proper operation of the support structure for the gradiometer, adjustment of the moment of inertia is provided by movably mounted masses 200, 202, and 204, and an additional similar mass on the back of mast 194. These masses have upright slots therein, with bolts passing through the slots so that vertical adjustment, followed by tightening of the bolt, changes the moment of inertia of the entire pendulum structure 180 which moves on pivot ball 190.

Additionally, fine adjustment of the moment of inertia, after the gross adjustment of the masses 200 through 204, is accomplished by masses 206, 208, 210 and 212. These masses are mounted upon threaded studs arranged orthogonally and extending out of plate 192. The masses have holes therethrough which are engaged on the studs, and nuts secure the masses in place. Orthogonal arrangement of both sets of masses permit separate adjustment of the moment of inertia in each of the two planes. Conveniently, the bubble chambers 12 and 16 lie in the upright othogonal planes through masses 206 and 210 and the mast axis.

Figure 8:
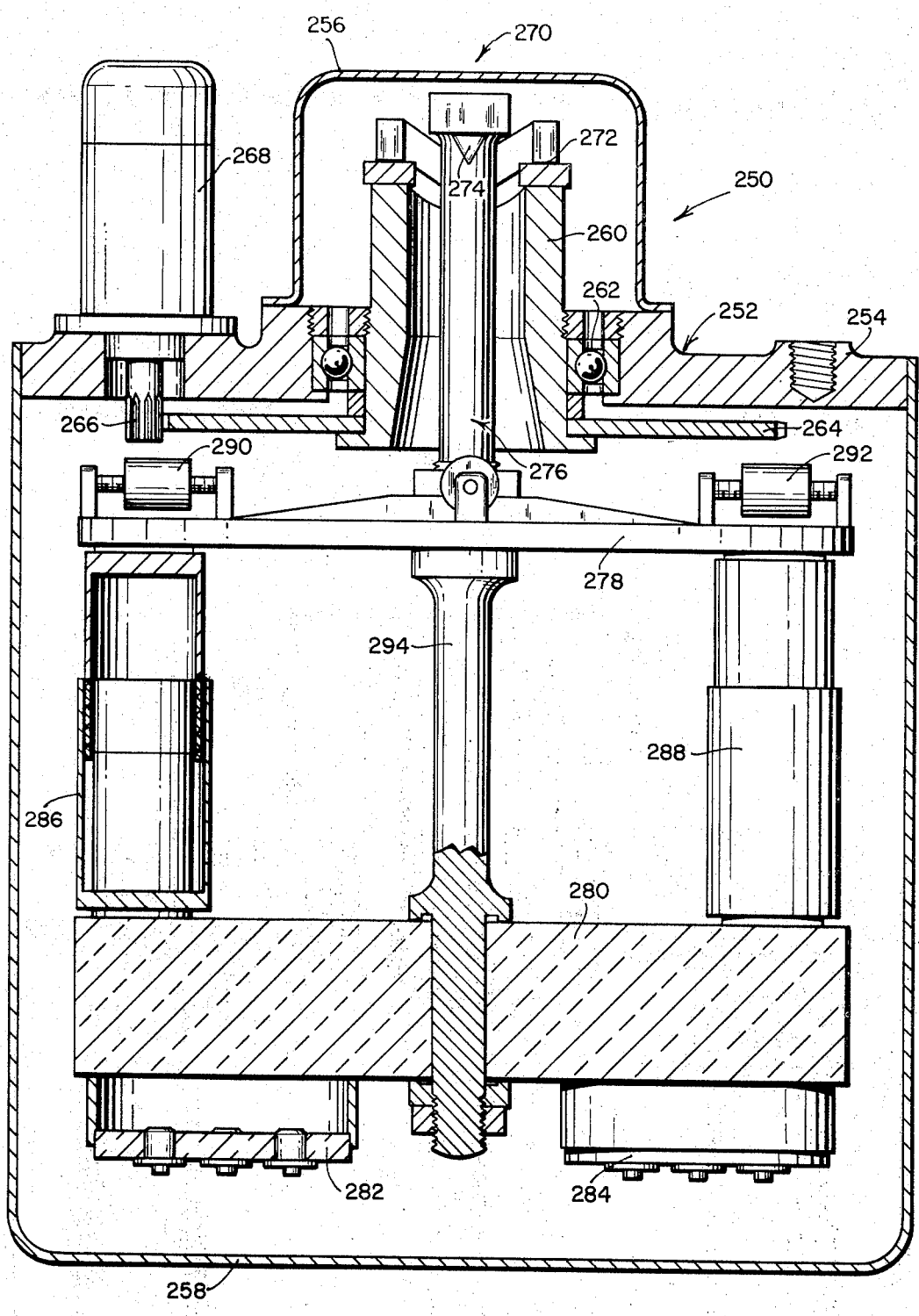
FIG. 8 is a vertical view through another physical embodiment of a gravity gradient apparatus employing the invention, taken generally adjacent the centerline, with some parts in elevation and others in vertical section.

In FIG. 8, another embodiment of the apparatus for gravity gradiometry is generally indicated at 250. Gradiometer 250 has a housing 252 which includes a top-mounting member 254 which carries covers 256 and 258. Covers 256 and 258 are not structural members, but merely protect the gradiometer from the ambient. Top-mounting member 254 serves as a structural mounting base for gravity gradiometer 252. Quill 260 is rotatably mounted on bearings 262 in top-mounting member 254. Gear 264 is carried on the quill and is in engagement with pinion 266, driven by azimuth motor 268. The azimuth motor is controlled by and driven by suitable accelerational and directional-sensing equipment that quill 260 occupies the same north-bearing position at all times during usage. Thus, azimuth of the quill 260 is stabilized.

A two-way knife-edge gimbal 270, having knife edges 272 and 274 at an angle with respect to each other, pendulously support mast 276, which extends downwardly through the hollow interior of quill 260. Mast 276 supports top motor plate 278, intermediate the ends of the mast. At the lower end of mast 276 is secured disc 280. Disc 280 carries four bubble chambers on the bottom thereof, two of which are shown at 282 and 284. The others are orthogonally arranged. Two force motors 286 and 288 are shown interconnecting between motor plate 278 and disc 280. There are eight such force motors corresponding to the motors 114 through 128 of the gradiometer 10. Similarly, the four bubble chambers correspond to the four bubble chambers of gradiometer 10.

Finally, weights 290 and 292, as well as two others orthogonally arranged with respect thereto, are adjustably secured to the top of motor plate 278. These weights permit adjustment of the neutral plane to correspond to the bottom planar surface of disc 280. Each of the described parts is inter-related in similar manner to the inter-relationship of the corresponding parts in the gradiometer 10. Similarly, they function similarly and have equivalent results. The portion 294 of the mast 276 which lies between the top motor plate 278 and disc 280 acts as a spring which supports and permits bending of disc 280, similarly to the support and bending of the disc 22, previously described. Thus, the gradiometer 250 is another embodiment of the gravity gradiometer apparatus, in accordance with this invention.

From the previous description of the individual tilt-detecting bubbles, it is seen that isolation is inherently provided by the fact that the two tiltmeter outputs are subtracted. To the extent that the two channels are alike, this will eliminate the effect of any motions which affect the two instruments alike. Further isolation can be provided by a low-pass filter which takes advantage of the fact that most of the interference is at a higher frequency than the desired signal.

A simple free pendulum has a property which is well-suited to providing additional isolation for the gradiometer-sensing system. The bubble sensor of the type described is sensitive only to accelerations having components along its input axis. In the sensor described, the input axes are parallel to the bottom of disc 22, and passing through the centers of the orthogonally-arranged tiltmeters. In the described support structure, the tilt-sensing structure is attached to the free pendulum structure in such a way that the sensitive input axis of the tiltmeter is horizontal when the pendulum is at rest. If the pendulum is caused to swing, the sensor will be subjected to acceleration components from three sources. These are the radial and tangential accelerations corresponding to the swinging motion of the pendulum and the component of gravity which lies along the input axis of the sensor any instant. The radial acceleration component will not affect the single accelerometer which is mounted on the pendulum axis, but must be considered in the case of a pair of sensors mounted off axis and aligned perpendicular to the axis, as in the sensor structure described above. A property of the pendulum is concerned with the tangential acceleration and the gravity component. These will generally be unequal, but in a particular plane lying at a particular distance from the pendulum pivot, these accelerations will be exactly equal and opposite and will, therefore, cancel. As shown below, this plane lies at a distance known as the radius of gyration from the pendulum pivot.

Figure 1:
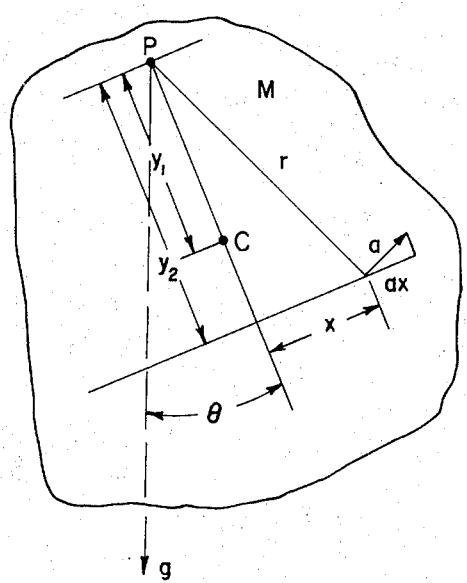
FIG. 1 is a schematic side-elevational view of an exemplary pendulum, showing dimensional nomenclature thereon for showing the existence of a neutral plane.

Referring to FIG. 1, consider a mass of arbitrary distribution having its center of gravity at C and suspended from a frictionless pivot at P. The line passing through P and C makes an angle $\theta$ with the gravity vector at some time as the mass swings about P in pendulum fashion. Let $y_2$ be the distance from P to a plane perpendicular to the line PC. The acceleration at an arbitrary point in the plane can now be calculated. Let $x$ be the distance from PC to the point. The angular acceleration $\alpha$ of the mass M about P will be $$\alpha = T/I$$

where:
$T$ = torque, and
$I$ = moment of inertia about P.

$$T = - My_1 \, g \sin \theta$$

where:
$g$ = acceleration of gravity
Then $$\alpha = -M/I \, y_1 \, g \sin \theta.$$

The acceleration $a$ perpendicular to radius $r$ at the point will be $$a = \alpha r.$$

The component $a_x$ of the acceleration $a$ is $$a_x = (y_2/r) \, a = \alpha y_2 = - (M/I) \, y_1 \, y_2 \, g \sin \theta$$

An accelerometer located at the point and oriented in the $x$ direction will sense $a_x$, but will also sense a component of gravity, $g \sin \theta$. The total acceleration sensed will be $$a_t = a_x + g \sin \theta = (1 - (M/I) \, y_1 \, y_2) \, g \sin \theta.$$

We now determine that a neutral plane exists where no acceleration is sensed. Setting $a_t = 0$, we have $$1 - M/I \, y_1 \, y_2 = 0.$$

or $$y_2 = I/My_1.$$

The plane at the distance $y_2$ is a neutral plane.

It will be noted that the relation is exact and is independent of both $g$ and $\theta$. This implies that an accelerometer in the neutral plane will read zero in a parallel gravity field of any strength and direction. From the solution of the distance $y_2$, it is clear why the moment of inertia adjustment is necessary. The structure is designed so that the bottom surface 20 of the disc 22 is on the neutral plane. Adjustment of the masses to adjust the moment of inertia adjusts the neutral plane to be coincident with the bottom surface of the disc. When so positioned, the tangential acceleration and the gravity component will be exactly equal and opposite and, therefore, cancelled. By this means, the sensing structure of the gravity gradiometer is isolated from accelerations applied by external means generally along the sensitive axes.

This invention having been described in its preferred embodiment, it is clear that it is susceptible to numerous modifications and embodiments within the ability of those skilled in the art and without the exercise of the inventive faculty. Accordingly, this invention is defined by the scope of the following claims.

What is claimed is:

1. A gravity gradiometer comprising:
   first and second spaced accelerometers, each having a sensitive axis, and having the sensitive axes thereof substantially aligned;
   means interconnecting said accelerometers for detecting gravity accelerational gradients therebetween; and
   means comprising a pivoted pendulous support for supporting said accelerometers substantially in a plane wherein tangential and gravity component accelerational forces due to forces which swing the pendulous support are equal and opposite so that said accelerometers do not detect those forces.

2. The gravity gradiometer of claim 1 wherein said pivoted pendulous support has a center of mass, and said plane in which said sensitive axes substantially lie lies normal to a line extending through said pivot and said center of mass.

3. The gravity gradiometer of claim 2 wherein said accelerometers lie on opposite sides of said line extending through said pivot and said center of mass.

4. The accelerometer of claim 3 wherein a mast pendulously depends from said pivot point, said accelerometers being positioned on said mast.

5. The accelerometer of claim 4 wherein a disc is secured to said mast, said disc having a substantially planar surface, which surface lies substantially on said plane.

6. The gravity gradiometer of claim 5 wherein adjustable weights are secured to said pendulous mast so that the position of the plane can be adjusted to substantially correspond to the planar surface of said disc.

7. The gravity gradiometer of claim 6 wherein said substantially planar surface is positioned on the bottom of said disc and said accelerometers comprise first and second bubble chambers secured to the bottom of said disc.

8. The gravity gradiometer of claim 7 wherein a housing is secured to said mast, said housing containing said disc, resilient means for resiliently supporting said disc with respect to said housing and motor means between said disc and said housing for tilting and bending said disc.

9. The gravity gradiometer of claim 8 wherein sensing means in said bubble chambers is interconnected with said motor means for tilting and bending said disc in response to gravity gradient signals between said accelerometers.

10. A gravity gradiometer comprising:
    a plurality of accelerometers, each having a sensitive axis;
    a pendulous support having a mass supported from a pivot;
    a plane perpendicular to a line through said pivot and the center of said mass and spaced from the pivot a distance equal to the moment of inertia of said pendulous mass divided by the product of the mass of said pendulous mass and the distance between said pivot and the center of said mass;
    means for mounting said accelerometers so that the axes thereof are positioned to sense a gravity gradient therebetween and are positioned substantially in said plane; and
    interconnection means between said accelerometers for providing an output corresponding to the gravity gradients between said accelerometers.

11. The gravity gradiometer of claim 10 wherein said accelerometers comprise bubble chambers having bubble position-detecting means therein and said bubble position-detecting means is connected to sense gravity gradients between said accelerometers.

12. The gravity gradiometer of claim 11 wherein each of said bubble chambers has liquid therein, and a bubble within said liquid, and said bubble position-detecting means comprises electrodes in contact with said liquid and out of contact with said bubble.

13. The gravity gradiometer of claim 12 wherein a bubble position output signal with respect to the bubble in one of said bubble chambers is combined with the bubble position output signal in another bubble chamber so that a gravity gradient signal results.

14. The gravity gradiometer of claim 13 wherein a support means is provided in said gradiometer, and four of said bubble chambers are mounted upon said support means.

15. The gravity gradiometer of claim 14 wherein each of said bubble chambers is arranged to detect bubble position along orthogonal axes, and said four bubble chambers are arranged in opposite pairs so that the axes of opposite pairs are in substantial alignment.

16. The gravity gradiometer of claim 15 wherein said bubble chamber output signals resulting from bubble position as detected by bubble position-detecting electrodes are combined to provide signals corresponding to restoring forces.

17. The gravity gradiometer of claim 16 wherein motor means are connected to said support means, and said restoring force signals are connected to said motor means for bending said support means to restore bubble position.

18. The gravity gradiometer of claim 17 wherein the motor means-energizing signals are combined in a network in such a manner that gravity gradient signals are produced.

19. The gravity gradiometer of claim 16 wherein said network includes network means which provides gravity gradient signals.

20. The gravity gradiometer of claim 17 wherein feedback from motor-energizing signals is connected into said network.

21. The gravity gradiometer of claim 10 wherein said accelerometers lie on opposite sides of the line extending through said pivot and the center of said mass.

22. The accelerometer of claim 21 wherein a mast pendulously depends from said pivot and a disc is secured to said mast, said disc having a substantially planar surface, which surface lies substantially on said plane.

23. The gravity gradiometer of claim 22 wherein said substantially planar surface is positioned on the bottom of said disc and said bubble chambers are secured to the bottom of said disc.

24. A gravity gradient meter comprising:
    a resilient member having first and second mounting locations thereon spaced laterally with respect to a local gravity vector, said resilient member having mass and being pendulously supported from a pivot;

a plane perpendicular to a line through said pivot and the center of said mass, said plane being spaced from the pivot such that lateral accelerational forces on said plane are equalled by tangential components of gravity, said first and second mounting locations lying substantially in said plane;

first and second local gravity vector sensing devices respectively secured to said resilient member at said first and second spaced mounting locations thereon, each of said gravity vector sensing devices having an output when the local gravity vector is away from a reference axis of said gravity vector sensing devices;

connection means connected to receive the outputs from said first and second sensing devices for indicating the gravity gradient between said first and second local gravity sensing devices; and force means connected to said connection means for receiving signals related to the sensing device outputs and connected to said resilient member for bending said resilient member in response to the outputs from said gravity vector sensing devices to bend said resilient member so that the reference axes of said first and second sensing devices are moved toward parallelism with their respective local gravity vectors.

25. The gravity gradiometer of claim 24 wherein said first and second local gravity vector sensing devices are positioned on said resilient member substantially on opposite sides of said line and third and fourth local gravity vector sensing devices are positioned between said first and second sensing devices and substantially on opposite sides of said line, said third and fourth local gravity vector sensing devices being connected to said connection means, and said force means being connected to bend said resilient member so that the reference axes of said third and fourth sensing devices are moved toward parallelism with their respective local gravity vectors.

* * * * *